United States Patent
Verma et al.

(10) Patent No.: US 10,496,190 B2
(45) Date of Patent: Dec. 3, 2019

(54) REDRAWING A USER INTERFACE BASED ON PEN PROXIMITY

(71) Applicant: Microsoft Technology Licensing, LLC, Redmond, WA (US)

(72) Inventors: Arunabh Verma, Seattle, WA (US); Sophie A. Beland, Seattle, WA (US); Kevin J. Jeyakumar, Bellevue, WA (US); Oluwadara Oke, Seattle, WA (US); William M. Geraci, II, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 15/415,863

(22) Filed: Jan. 25, 2017

(65) Prior Publication Data

US 2018/0210567 A1 Jul. 26, 2018

(51) Int. Cl.
*G06F 3/0354* (2013.01)
*G06F 3/038* (2013.01)
*G06F 3/0484* (2013.01)
*G06F 3/041* (2006.01)
*G06F 3/0488* (2013.01)

(52) U.S. Cl.
CPC .......... *G06F 3/03545* (2013.01); *G06F 3/038* (2013.01); *G06F 3/041* (2013.01); *G06F 3/0416* (2013.01); *G06F 3/0484* (2013.01); *G06F 3/04883* (2013.01); *G06F 2203/0384* (2013.01); *G06F 2203/04108* (2013.01)

(58) Field of Classification Search
None
See application file for complete search history.

(56) References Cited

U.S. PATENT DOCUMENTS

| | | |
|---|---|---|
| 6,625,314 B1 | 9/2003 | Okamoto |
| 6,795,429 B1 | 9/2004 | Schuster et al. |
| 9,190,075 B1 | 11/2015 | Cronin |
| 9,191,483 B2 | 11/2015 | Jendbro |

(Continued)

FOREIGN PATENT DOCUMENTS

| | | |
|---|---|---|
| CA | 2777633 A1 | 9/2001 |
| EP | 2711825 A2 | 3/2014 |
| WO | 2015174111 A1 | 11/2015 |

OTHER PUBLICATIONS

"Pen-Aware Applications", http://winapi.freetechsecrets.com/penapi/PENAPIPenAware_Applications.htm, 2008, 1 page.

(Continued)

*Primary Examiner* — Gustavo Polo

(57) ABSTRACT

The electronic devices described herein are configured to enhance user experience associated with using a pen on the touchscreens of the electronic devices. Proximity and/or approach of a pen is detected and, when the pen is close enough, the operating system triggers a pen event, which is communicated to applications running on the electronic devices. The applications may handle the pen event by redrawing a user interface to accommodate the incoming pen input in a smooth, seamless way. Further, pen-compatible interface controls may be provided by the operating system to enhance pen use with applications that may not have the necessary functionality.

20 Claims, 7 Drawing Sheets

(56) References Cited

U.S. PATENT DOCUMENTS

| | | |
|---|---|---|
| 2005/0110774 A1 | 5/2005 | Zuta et al. |
| 2006/0161871 A1 | 7/2006 | Hotelling et al. |
| 2007/0063994 A1 | 3/2007 | Carlson et al. |
| 2010/0067674 A1 | 3/2010 | Lee |
| 2012/0013558 A1* | 1/2012 | Lin ................. G06F 3/0416 345/173 |
| 2013/0135220 A1 | 5/2013 | Alameh et al. |
| 2013/0155015 A1* | 6/2013 | Chang ............... G06F 3/044 345/174 |
| 2013/0188081 A1 | 7/2013 | Kulas |
| 2013/0285929 A1 | 10/2013 | Theimer et al. |
| 2014/0055426 A1 | 2/2014 | Park et al. |
| 2014/0055427 A1 | 2/2014 | Kim et al. |

OTHER PUBLICATIONS

Cozma, Nicole, "Use handwriting to input text on Android with MyScript Stylus", https://www.cnet.com/how-to/use-handwriting-to-input-text-on-android-with-myscript-stylus/, Sep. 27, 2013, 15 pages.

Li, et al, "A Context-Aware Infrastructure for Supporting Applications with Pen-Based Interaction", In Journal of Computer Science and Technology, vol. 18, Issue 3, May 1, 2003, 6 pages.

"International Search Report and Written Opinion Issued in PCT Application No. PCT/US18/014297", dated May 11, 2018, 12 Pages.

* cited by examiner

REDRAWING A USER INTERFACE BASED ON PEN PROXIMITY

BACKGROUND

Electronic devices, such as personal computers, laptops, mobile phones, and the like are increasingly equipped with touch screens or similar interfaces that enable a user to provide input by writing or drawing with a stylus, pen, or other pen-like device. For instance, tablet computers, which include touch screens as the primary user interface, have become popular alternatives to conventional laptops with keyboards, mice, etc. The ability to draw or write by hand on the touch screen offers substantial flexibility regarding possible inputs. However, user interfaces of many modern applications do not easily accommodate writing and drawing during normal use. For example, some applications require a user to select a particular button in order to activate a pen-compatible mode, or may simply not support pen input in a useful way.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computerized method comprises executing, by an application, a pen event handler routine that checks the status of a pen event, the pen event indicating that a pen is proximate to a device, upon receipt of the pen event from an operating system, setting a flag, and upon setting the flag, redrawing a user interface of the application to accommodate input from the pen.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 7, the systems are illustrated as schematic drawings. The drawings may not be to scale.

DETAILED DESCRIPTION

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

The electronic devices described below are configured to enhance user experience associated with using a pen on the touchscreens of the electronic devices. Proximity and/or approach of a pen is detected and, when the pen is close enough, the operating system triggers a pen event, which is communicated to applications running on the electronic devices. The applications may handle the pen event by redrawing a user interface to accommodate the incoming pen input in a smooth, seamless way. Further, pen-compatible interface controls may be provided by the operating system to enhance pen use with applications that may not have the necessary functionality. The disclosure provides a smooth and simple user experience incorporating use of a pen or pen-like device in touch screen enabled devices.

Figure 1:
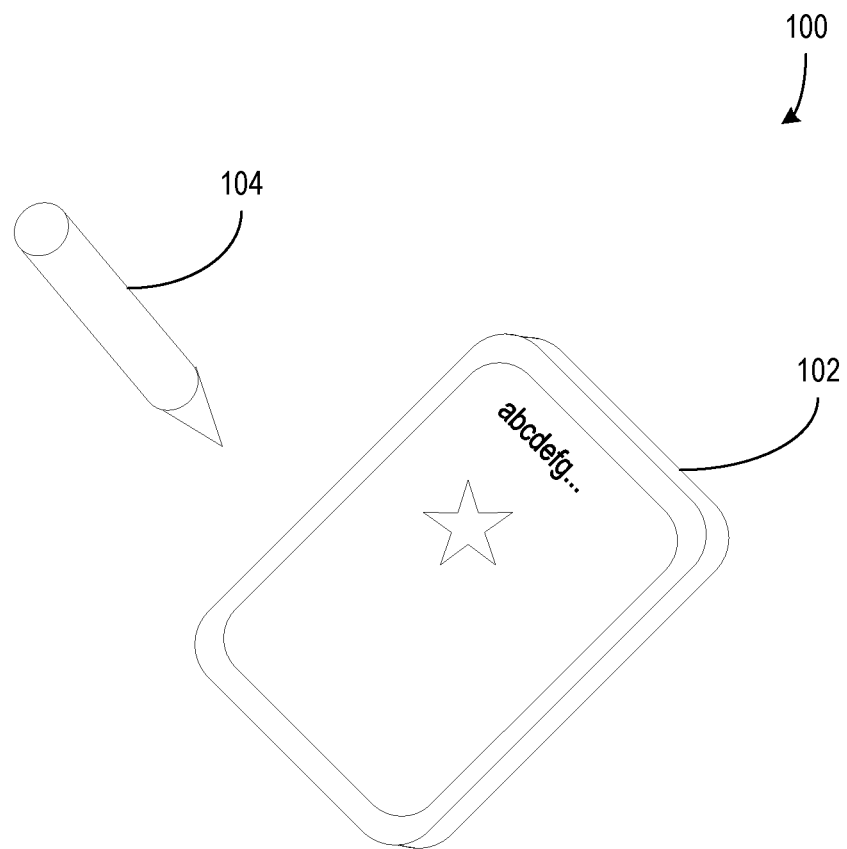
FIG. 1 illustrates a system including an electronic device and an associated pen according to an embodiment.

FIG. 1 illustrates a system 100 including an electronic device 102 and an associated pen 104 according to an embodiment. The electronic device 102 and pen (or pen device) 104 may be associated or linked such that the electronic device 102 and the pen 104 respond to each other. In an example, the pen 104 may be uniquely associated with the electronic device 102 such that other pens and/or similar devices do not interact or interact differently with the electronic device 102.

The electronic device 102 includes a screen interface. The screen interface may receive input via touch sensor(s), pressure sensor(s), or the like. The input may be in the form of shapes, expressions, symbols, handwriting, etc. In an example, the pen 104 may be used to touch, contact, depress, or otherwise interact with the screen interface in order to provide input to the electronic device 102.

The pen 104 may comprise electronic components that enable the pen 104 to interact with the electronic device 102, a user of the pen 104, other electronic devices, etc. For instance, the pen 104 may include a wireless interface that enables the pen 104 to communicate wirelessly (via WiFi, cellular, BLUETOOTH brand short-range wireless communication protocol, other radio frequency communications, etc.) with the electronic device 102, even when the pen 104 is not in contact with the electronic device 102. Further, the pen 104 may include buttons, switches, and/or other input interfaces which a user of the pen 104 may use to interact with the pen 104 and/or electronic components of the pen 104. Additionally, or alternatively, the pen 104 may include pressure sensors, motion sensors, accelerometers, gyroscopic sensors, or the like that enable the detection of motion, direction, angle, user input, gestures, etc. of the pen 104.

The electronic device 102 may detect a proximity of the pen 104 to the electronic device 102. The pen 104 may emit, transmit, or otherwise send a signal wirelessly that may be received and interpreted by the electronic device 102 to determine a proximity of the pen 104 relative to the electronic device 102. The detection of pen proximity to the electronic device 102 may include interpreting a signal strength of a wireless signal from the pen 104 as an indicator of pen proximity. For instance, the signal strength of the wireless signal may be strong when the pen 104 is close to the electronic device 102 and the signal strength of the wireless signal may become weaker as the pen 104 moves away from the electronic device 102. Alternatively, or additionally, the pen may transmit, to the electronic device 102, information describing pen motion, pen direction, pen angle, etc. that may be used by the electronic device 102 to further determine a location and/or proximity of the pen 104 relative to the electronic device 102.

In an example, the electronic device 102 may detect a proximity of the pen 104 by, at least in part, detecting a wireless signal from the pen 104. Further, the electronic device 102 may detect a proximity of the pen 104 by, at least in part, detecting a signal strength of the wireless signal from the pen 104. A pen proximity threshold may be defined to include a signal strength threshold such that, when the signal strength threshold is crossed, the electronic device 102 may determine that the pen 104 is within the pen proximity threshold.

Figure 2:
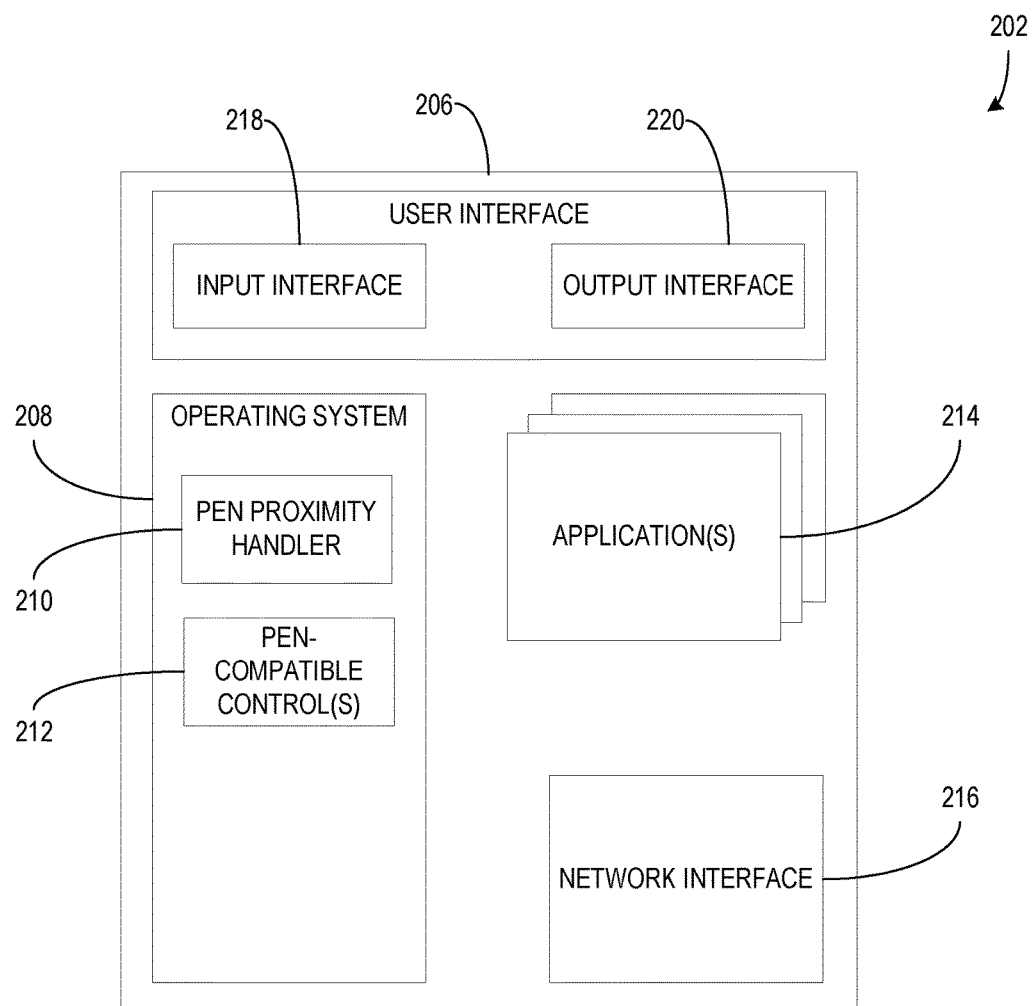
FIG. 2 illustrates a block diagram of an electronic device including a pen proximity handler and pen-compatible control(s) according to an embodiment.

FIG. 2 illustrates a block diagram of an electronic device 202 including a including a pen proximity handler 210 and pen-compatible control(s) 212 according to an embodiment. The electronic device 202 comprises a user interface 206, an operating system 208 including a pen proximity handler 210 and pen-compatible control(s) 212, application(s) 214, and a network interface 216. The user interface 206 comprises an input interface 218 and an output interface 220.

In an example, the user interface 206 includes a touch screen. The input interface 206 includes a layer or portion of the touch screen that detects the location of contact, depression, or the like on the touch screen. Contact on the touch screen, whether by a user's finger, pen, stylus, or the like, is detected by the input interface 218 and interpreted as input to the user interface 206. The output interface 220 includes a layer or portion of the touch screen that displays, renders, or otherwise outputs information to a user of the electronic device 202. The output interface 220 may display colors, shapes, letters, or the like to communicate output information to a user of the electronic device.

Alternatively, or additionally, the input interface 218 may receive input from a pen device (e.g., pen device 104, etc.) linked to the electronic device 202 as described above with respect to FIG. 1. The pen device and electronic device 202 may be in communication via the network interface 216 of the electronic device 202.

The input interface 218 may include other interfaces, such as keyboards, mice, switches, buttons, microphones, cameras, motion detection, etc. These components of the input interface 218 further enable a user to input information into the electronic device 202. For instance, a camera associated with the input interface 218 may detect a user's gestures and interpret the gestures as a form of input information. For example, the camera and input interface 218 may be associated with an augmented reality device and/or a virtual reality device.

In an example, the output interface 220 may further include speakers, vibration components, projector components, etc. These components of the output interface 220 further enable the electronic device 202 to communicate output information to a user. For instance, a vibration component of the output interface 220 may vibrate to provide a notification to the user of the electronic device 202.

The operating system 208 is a software component configured to perform core software operations of the electronic device 202 and to provide a platform upon which other software components (e.g., application(s) 214, etc.) are executed. It should be understood that the operating system 208 functions according to typical methods as understood by a person of ordinary skill in the art of computer science, computer engineering, or the like. Further, the operating system 208 includes a pen proximity handler 210 and one or more pen-compatible control(s) 212.

The pen proximity handler 210 comprises software that may interact with the user interface 206, including receiving pen proximity data associated with a pen device (e.g., pen device 104, etc.). The pen proximity handler 210 may listen for communications from the user interface 206 associated with pen proximity data during use of the electronic device 202. Based on received pen proximity data/communications, the pen proximity handler 210 may trigger, or throw, a pen event that may be sent to and/or received by other software components (e.g., application(s) 214, etc.) of the electronic device 202.

The pen-compatible control(s) 212 are software components associated with the operating system 208 that may cause the electronic device 202 to react to and/or interact with a pen (e.g., pen 104, etc.). In an example, a pen-compatible control 212 may cause the user interface 206 to provide a user of the electronic device 202 with a writing region, information and/or guidance regarding context of the writing region, or the like. For instance, a pen-compatible control 212 may cause the user interface 206 to display a box on the screen containing a writing region and a prompt in or near the box describing the box as an address field, name field, signature field, search term field, or the like. Further pen-compatible controls may include check boxes and/or list items that expand to provide additional details based on the proximity of the pen or map controls that zoom in to a geographic area and provide a virtual writing area associated with the geographic area that the user may use to add notes about the geographic area.

The application(s) 214 are software components that may be installed on the electronic device 202. In an example, an application 214 uses the operating system 208 as a platform for executing instructions and/or providing functionality to a user of the electronic device 202. For instance, an application 214 may be a word processing application, an email application, a web browser, a messaging application, a game, or the like. It should be understood that the application(s) 214 may be of any application type known to a person of ordinary skill in the art without departing from the scope of the description herein.

An application 214 may include a pen event handler component that is configured to receive, detect, and/or react to pen events that are triggered by the operating system. The pen event handler of the application 214 may cause the activation of pen-compatible controls, redrawing of the user interface as described herein, etc. The application 214 may include a pen event flag or other indicator or setting that is set when a pen event is detected. In the normal course of operation, the application 214 may redraw the user interface at a regular interval. The pen event flag may be checked each time a redraw process is executed. When the pen event flag is not set, the user interface is redrawn according to the normal operation of the application 214. However, when the pen event flag is set, the user interface may be redrawn to accommodate incoming pen input by causing to display a pen-compatible control.

An application 214 may lack application-specific controls and/or functionality to accept and process pen input, and instead may access one or more pen-compatible controls 212 from the operating system 208 for use within the application 214 when pen input is detected. For instance, a messaging application may not be configured to handle pen input and, when a pen event is received by the messaging application, the messaging application may access or request to use a pen-compatible control provided by the operating system 208 to display a writing region and convert pen input into text which the messaging application may then use to communicate to a user's contact in a message. The request may occur via an application programming interface (API) call to the operating system.

Alternatively, an application 214 may be configured to include pen-compatible controls and may handle incoming pen events without requesting a pen-compatible control 212 from the operating system 208. For instance, a map application may include a pen-compatible control 212 that automatically transforms pen input on a map region of the user interface 206 into a pinpoint on the map. Further, a user may be prompted as to whether the pinpoint is a new destination, a new location of interest, or the like.

The network interface 216 provides an interface by which the electronic device 202 may communicate with other electronic devices, computing devices, access points, or the like. The network interface 216 may provide access to one or more channels of network communication, including wired network connections, wireless network connections, etc. In some examples, components described as being part of the electronic device 202 may instead be located outside of the electronic device 202 and accessed by the electronic device via the network interface 216.

In an example, the electronic device comprises a user interface, at least one processor, and at least one memory comprising computer program code. The computer program code is configured to, with the at least one processor, perform the operations illustrated in the flowcharts.

Figure 3:
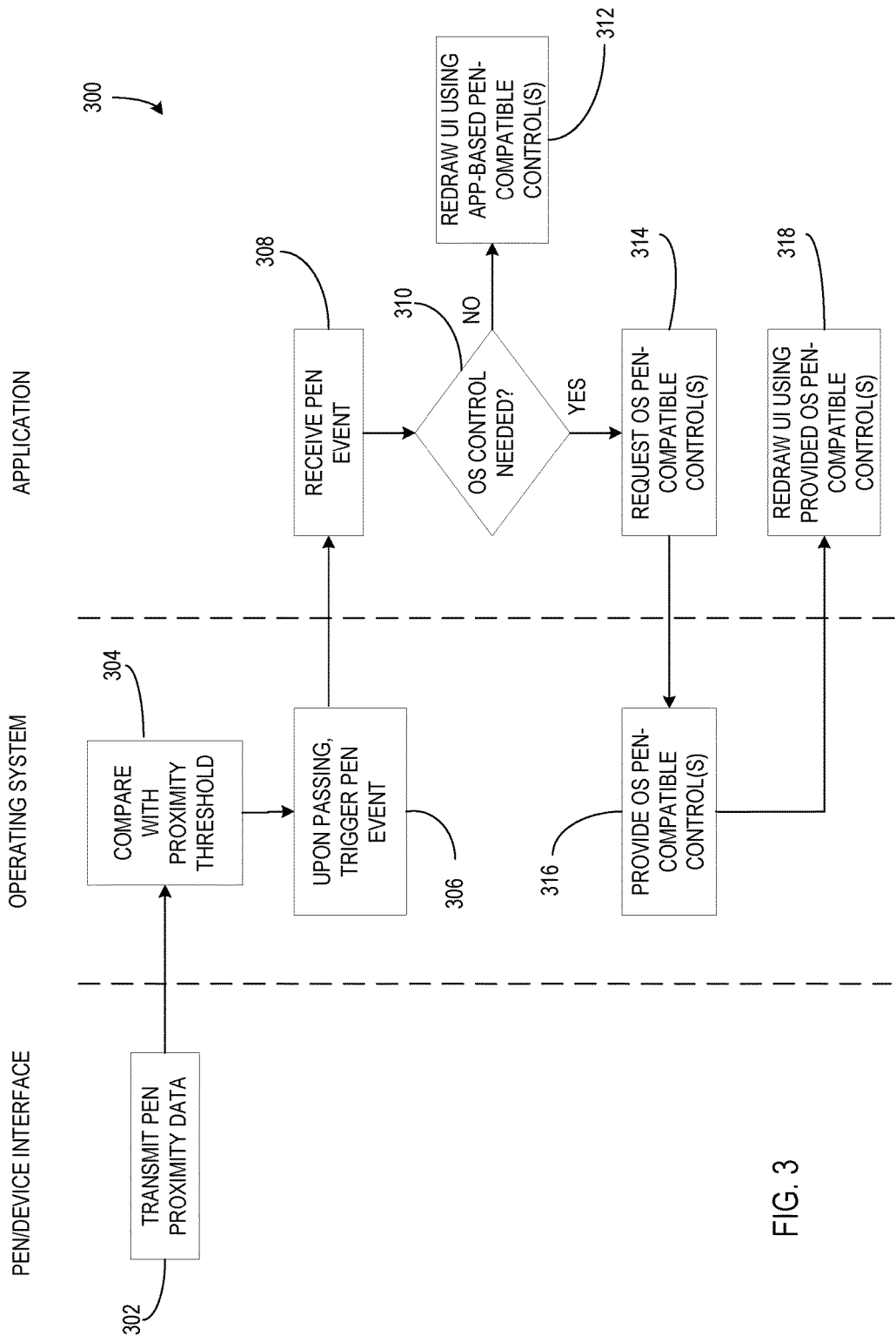
FIG. 3 illustrates a diagram of interactions between pen/device interface, operating system, and application according to an embodiment.

FIG. 3 illustrates a diagram of interactions between a pen/device interface (e.g., user interface 206, etc.), an operating system (e.g., operating system 208, etc.), and an application (e.g., an application 214, etc.) according to an embodiment. The pen/device interface transmits pen proximity data to the operating system at 302. At 304, the operating system receives the pen proximity data and determines whether a proximity threshold is crossed or passed based on the pen proximity data. If so, at 306, the operating system triggers a pen event. The triggered pen event may be sent to an application, which receives the pen event at 308. At 310, the application determines whether a pen-compatible control from the operating system is necessary in order to collect incoming pen input associated with the pen event or otherwise respond to the pen event. If not, at 312, the application redraws the user interface using at least one app-based pen-compatible control. If an operating system pen-compatible control is needed, the application requests the pen-compatible control from the operating system at 314. At 316, the operating system provides the pen-compatible control to the application. At 318, the application redraws the user interface using the pen-compatible control provided by the operating system.

The pen proximity data may include signal strength data as described above. Further, pen proximity data may include other data points associated with the pen, such as pen position data, pen motion data, pen acceleration data, or the like. Additionally, or alternatively, the pen proximity data may also include data pertaining to the type of the pen, an identifier of the pen, a user identifier associated with the pen, etc. for identifying the pen and/or providing a pen user experience tailored to the particular pen and/or particular user.

The proximity threshold may be defined as a default value or values or it may be configurable by a user of the device. Determining whether the proximity threshold is passed may include comparing a received signal strength value to a defined signal strength threshold, as described above. Additionally, or alternatively, the proximity threshold may include an approach rate threshold or range, such that a pen event may be triggered when the pen moves toward the electronic device at a rate above or below a defined approach rate threshold, or within an approach rate range.

In a further example, a pen orientation may be used when determining whether the proximity threshold is passed. For instance, the pen may provide data indicating whether the tip of the pen is pointed at the electronic device or away from the electronic device. The proximity threshold may be passable when the tip of the pen is pointed toward the electronic device but not passable when the tip of the pen is pointed away from the electronic device. Additionally, or alternatively, the ends of the pen may be configured for different functionality, such that the pen orientation data affects how the pen event may be handled. For instance, the tip of the pen may be handled as writing virtual ink on a writing region of the user interface, whereas the opposite end may be handled as erasing the virtual ink on the writing region of the user interface.

The pen event that is triggered based on the passing of the proximity threshold may include an indicator that a pen is approaching the user interface of the electronic device. Further, the pen event may include information regarding the type of the pen approaching, the orientation of the pen as described above, gestures made by the pen, etc. The pen event, when triggered, may be delivered to, interrupt, or otherwise interact with applications that are currently running on the operating system. The pen event may be directed to only those applications that are active, being displayed on the user interface, or will otherwise be affected by pen input. Further, pen events may be sent only to applications which subscribe with the operating system to receive pen events, as many applications may not have a user interface component such that pen events have no effect. Alternatively, or additionally, the operating system may provide an application program interface (API) associated with pen events that applications may access to query as to whether pen events have been triggered.

The operating system may be configured to trigger multiple types of pen events. Different pen events may be used for different pens, users, types of pens, actions or gestures of pens, orientation of pens, etc. Each type of pen event may be handled by the same or different methods as other types of pen events.

The application may receive the pen event when triggered by the operating system by an interrupt, message, or the like. The application may subscribe to pen events from the operating system and thereby receive pen events when they are triggered. The pen event(s) may include information that the application may use to determine how to handle the pen event(s). For instance, the pen event may include a pen event type as described above.

In an example, determining if an operating system control is needed includes identifying a control and/or type of control that may be necessary based on the pen event, pen event type, or other data associated with the pen event. When the application includes a pen-compatible control that handles the received pen event, the application may determine that an operating system control is not needed. Alternatively, when the application does not include a pen-compatible control that handles the received pen event, the application may determine that an operating system control is needed.

The operating system may provide pen-compatible controls to applications by exposing APIs to applications, enabling the applications to invoke the pen-compatible controls through use of the APIs. The APIs may further be used by the applications to extract input data from the control in various formats, select a position for the control to be displayed, select appearance attributes of the control, etc.

Redrawing a user interface using pen-compatible controls may include overlaying a control over the current content of the user interface, resizing portions of the user interface to accommodate the new pen-compatible control, zooming in on a portion of the user interface, highlighting a portion of the user interface, displaying instructions/prompts on the user interface, etc. For instance, a user may fill out a form in a web browser application and, when the user brings a pen in proximity of the electronic device, a text field of the form may be highlighted, enlarged or zoomed in, etc. and text or symbols may be displayed in a prompt to instruct the user about the context of the text field. Redrawing the user interface may further include an animation of movement, stretching, growing, or the like to highlight or bring attention to a pen-compatible control.

The application may include a pen event flag that is set or toggled upon receiving a pen event. The flag may be checked by the application when the application executes a redraw process and, when the flag is set, the redraw process may include one or more pen-compatible controls. When the flag is not set, the redraw process may not include pen-compatible controls. If pen-compatible controls were included in a previous redraw process, but the flag is no longer set, the application may redraw the user interface to restore it to a state that occurred prior to a received pen event. This redraw process may include details such as, highlighting, resizing, overlaying, animation, etc. as described above with respect to redrawing the user interface to accommodate the pen input.

In a further example, the application and/or operating system may identify when pen input is complete in order to determine when to restore the user interface to a prior state. For instance, a pause threshold may be defined such that when an active pen input session has been idle for a time period that exceeds the pause threshold, the pen input session is considered complete. Alternatively, or additionally, a user may explicitly signal the completion of the pen input using gestures (e.g., double tap, invert the pen, put the pen down on another surface, etc.) or a physical button on the pen device, etc. The pen input being considered complete may cause the flag to be toggled or unset, such that the user interface may be restored to a state from prior to the user interface being redrawn to accommodate the pen input.

Upon the user interface being redrawn to accommodate the input from the pen device and determining that the input from the pen device is complete, the user interface is restored to a state from prior to the user interface being redrawn to accommodate the input from the pen device.

Figure 4:
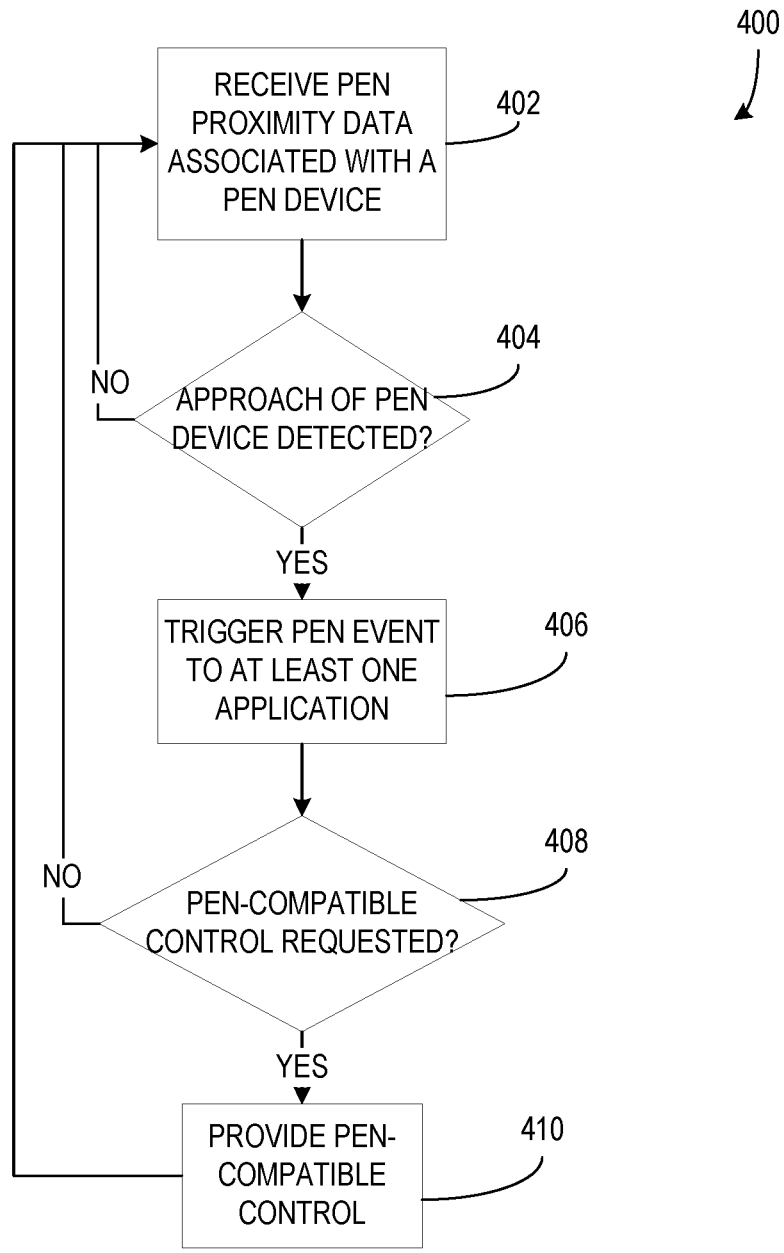
FIG. 4 illustrates a flow chart of a method of receiving and handling pen proximity data by an operating system according to an embodiment.

FIG. 4 illustrates a flow chart of a method 400 of receiving and handling pen proximity data by an operating system according to an embodiment. The method 400 comprises receiving, by an operating system, at 402, pen proximity data associated with a pen device. Detecting the approach of a pen device based on the pen proximity data occurs at 404. Detecting the approach includes detecting a wireless signal from the pen device (e.g., detecting a change in signal strength of the wireless signal).

If the pen approach is detected, a pen event is triggered at 406 to at least one application.

Upon the pen event being triggered and a pen-compatible control being requested by the at least one application, at 408, the pen-compatible control is provided to at least one application at 410. In some examples, the pen-compatible control includes at least one of a writing region, an animation, or a prompt.

Figure 5:
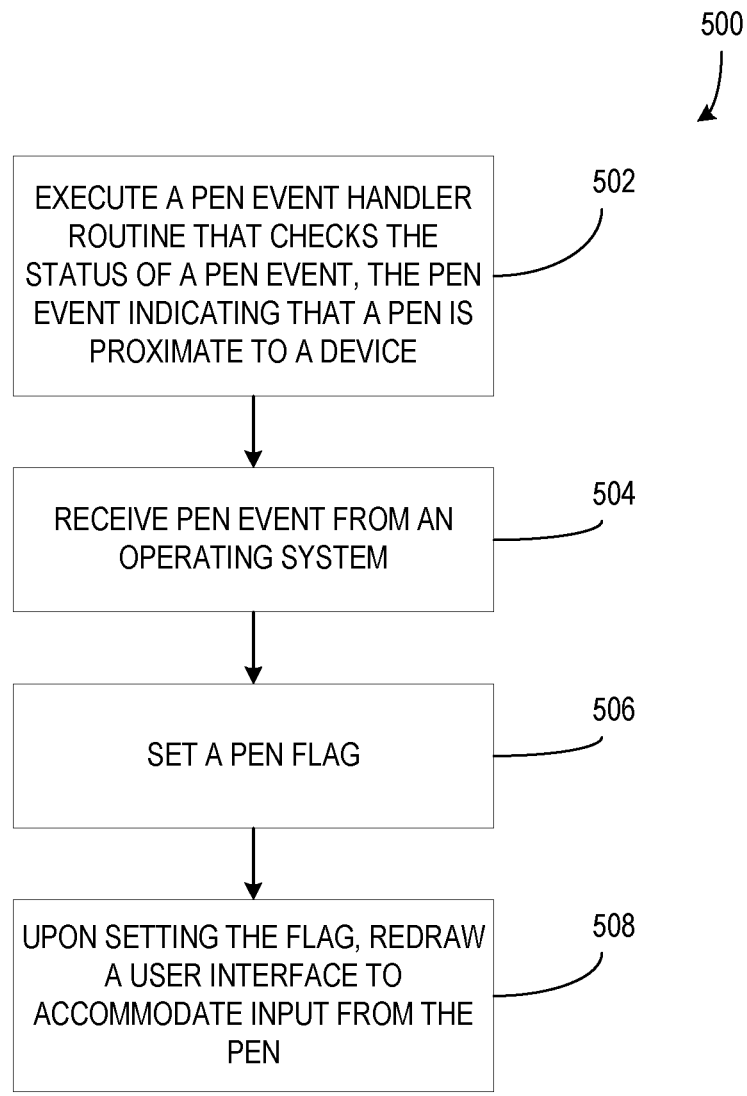
FIG. 5 illustrates a flow chart of a method of handling a pen event by redrawing a user interface to accommodate input from the pen according to an embodiment.

FIG. 5 illustrates a flow chart of a method 500 of handling a pen event by redrawing a user interface to accommodate input from the pen according to an embodiment. The method 500 comprises executing, by an application, at 502, a pen event handler routine that checks the status of a pen event. The pen event indicates that the pen is proximate to a device. Upon receipt of the pen event from an operating system, at 504, a flag is set at 506; Upon setting the flag, the application redraws, at 508, a user interface of the application to accommodate input from the pen.

Redrawing a user interface to accommodate input from the pen includes redrawing the user interface to display at least one pen-compatible control for accepting ink input from the pen. The application retrieves the pen-compatible control from an operating system. In some examples, the redrawn user interface includes at least one of a highlighted writing region, a zoomed-in writing region, or a prompt.

In a further example, the method further comprises receiving input from the pen via the user interface, and, upon determining the received input from the pen is complete (e.g., detecting a pause in the received input from the pen that crosses a defined pause threshold), restoring the user interface to a state from prior to redrawing the user interface of the application to accommodate input from the pen. For example, the pen-compatible control is removed from the user interface.

Figure 6:
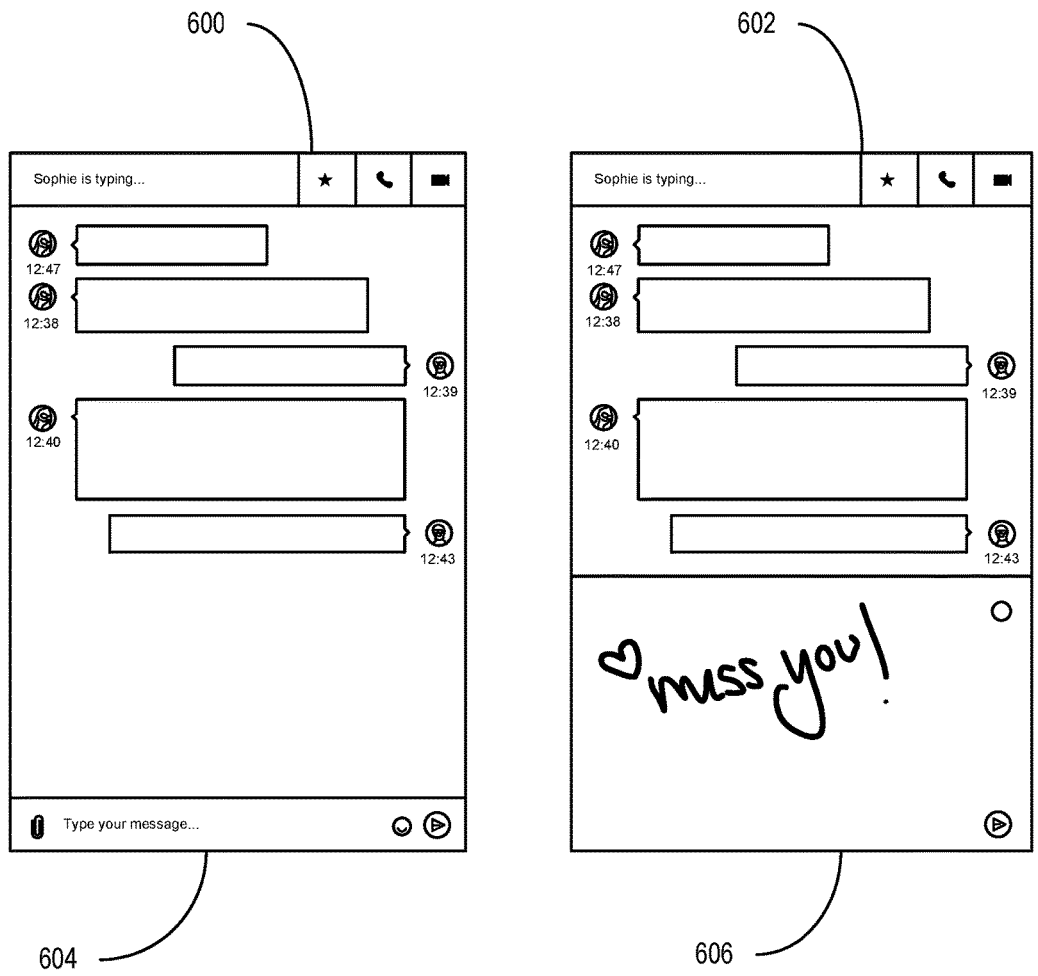
FIG. 6 illustrates before and after screenshots of a user interface being redrawn to accommodate pen input according to an embodiment.

FIG. 6 illustrates before and after screenshots 600 and 602 of a user interface being redrawn to accommodate pen input according to an embodiment. A first screenshot 600 illustrates an exemplary messaging application interface, including past messages between the participants and a reply box 604. The reply box 604 may enable a user to type a new message and send the typed message to the other participant(s). A second screenshot 602 illustrates the messaging application interface after it has been redrawn due to pen proximity as described herein. The portion of the interface containing past messages remains largely unchanged, but the reply box 604 has been redrawn as a canvas 606, which better accommodates pen input from the user by providing additional space in which to write and/or draw. In the illustrated example, a user has drawn a heart and written "miss you!" in the canvas 606 with a pen. The user may then send the drawn/written message to other participant(s) in the messaging application.

Figure 7:
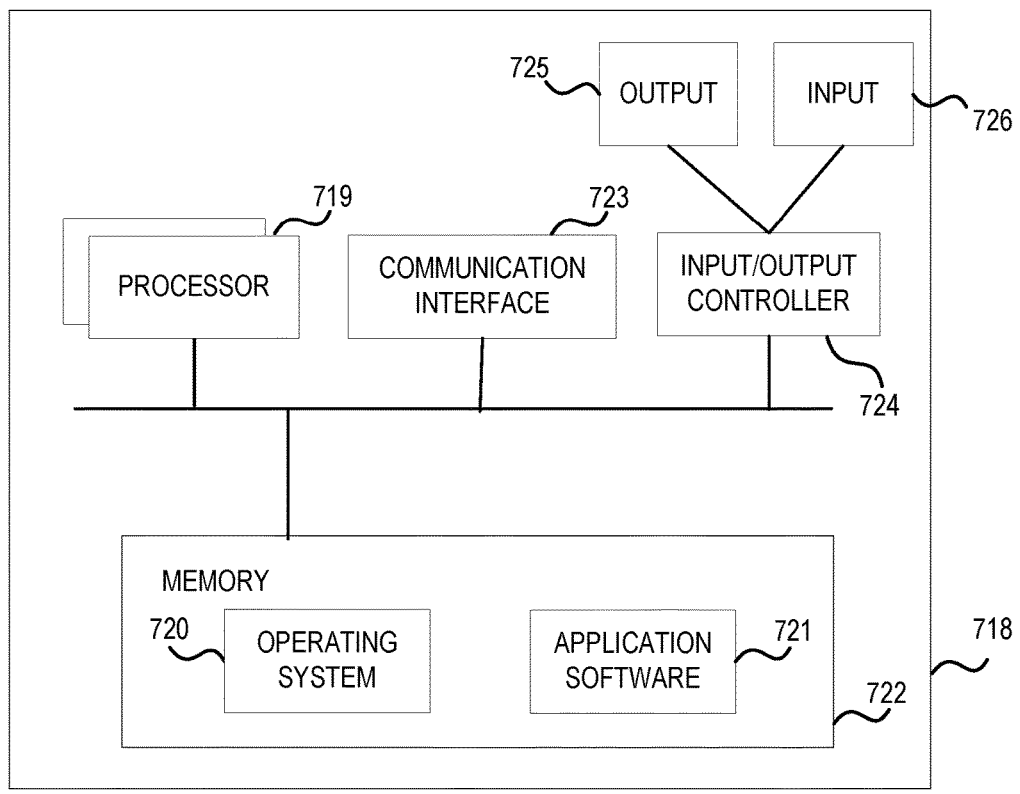
FIG. 7 illustrates a computing apparatus according to an embodiment as a functional block diagram.

FIG. 7 illustrates a computing apparatus 718 according to an embodiment as a functional block diagram. In an embodiment, components of a computing apparatus 718 may be implemented as a part of an electronic device and/or computing device according to one or more embodiments described in this specification. The computing apparatus 718 comprises one or more processors 719 which may be microprocessors, controllers or any other suitable type of processors for processing computer executable instructions to control the operation of the electronic device. Platform software comprising an operating system 720 or any other suitable platform software may be provided on the apparatus 718 to enable application software 721 to be executed on the device. According to an embodiment, receiving pen proximity data, triggering pen events, setting pen flags, and redrawing a user interface to accommodate input from the pen may be accomplished by software. Furthermore, it may receive network communications from other computing devices via a network or other type of communication link pertaining to pen proximity, pen events, or the like.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch sensitive display. The input/output controller 724 may also output data to devices other than the output device, e.g. a locally connected printing device.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, augmented reality devices, virtual reality devices, etc.

Alternatively, or in addition to the other examples described herein, examples include any combination of the following:

An electronic device comprising:
a user interface;
at least one processor; and
at least one memory comprising computer program code, the at least one memory and the computer program code configured to, with the at least one processor, cause the electronic device to at least:
detect a proximity of a pen device to the user interface of the electronic device;
upon the proximity of the pen device crossing a pen proximity threshold, set a pen proximity flag; and
upon the pen proximity flag being set, redraw the user interface to accommodate input from the pen device.

The electronic device described above, wherein detecting a proximity of a pen device includes detecting a wireless signal from the pen device.

The electronic device described above, wherein detecting a proximity of a pen device includes detecting a signal strength of the wireless signal from the pen device; and wherein the pen proximity threshold includes a defined signal strength threshold.

The electronic device described above, wherein redrawing the user interface to accommodate input from the pen device includes redrawing, by an application running on the electronic device, the user interface to accommodate input from the pen device.

The electronic device described above, wherein redrawing the user interface to accommodate the input from the pen device includes redrawing the user interface using at least one pen-compatible control from at least one of the application or an operating system associated with the electronic device.

The electronic device described above, wherein redrawing the user interface to accommodate the input from the pen device includes redrawing the user interface to include at least one of a highlighted writing region, a zoomed-in writing region, or a prompt.

The electronic device described above, the at least one memory and the computer program code configured to, with the at least one processor, further cause the electronic device to at least, upon the user interface being redrawn to accommodate the input from the pen device and determining that the input from the pen device is complete, restore the user interface to a state from prior to the user interface being redrawn to accommodate the input from the pen device.

The electronic device described above, wherein detecting a proximity of a pen device includes detecting a proximity of a pen device that is linked to the electronic device.

A method comprising:
executing, by an application, a pen event handler routine that checks the status of a pen event, the pen event indicating that a pen is proximate to a device;
upon receipt of the pen event from an operating system, setting a flag; and
upon setting the flag, redrawing a user interface of the application to accommodate input from the pen.

The method described above, wherein redrawing a user interface to accommodate input from the pen includes redrawing the user interface using at least one pen-compatible control.

The method described above, wherein redrawing the user interface using at least one pen-compatible control includes retrieving at least one pen-compatible control from an operating system.

The method described above, wherein redrawing a user interface to accommodate input from a pen includes redrawing the user interface to include at least one of a highlighted writing region, a zoomed-in writing region, or a prompt.

The method described above, further comprising:
receiving input from the pen via the user interface; and
upon determining the received input from the pen is complete, restoring the user interface to a state from prior to redrawing the user interface of the application to accommodate input from the pen.

The method described above, wherein determining the received input from the pen is complete includes detecting a pause in the received input from the pen that crosses a defined pause threshold.

One or more computer storage media having computer-executable instructions that, upon execution by a processor, cause the processor to at least:
receive, by an operating system, pen proximity data associated with a pen device;
upon detecting approach of a pen device based on the pen proximity data, trigger a pen event, wherein the pen event is provided to at least one application; and
upon the pen event being triggered and a pen-compatible control being requested by the at least one application, provide a pen-compatible control to the at least one application.

The one or more computer storage media described above, detecting approach of a pen device based on the pen proximity data includes detecting a wireless signal from the pen device.

The one or more computer storage media described above, wherein the wireless signal is a short-range radio frequency signal.

The one or more computer storage media described above, wherein detecting approach of a pen device includes detecting a change in signal strength of the wireless signal from the pen device.

The one or more computer storage media described above, wherein the pen-compatible control includes at least one of a writing region, an animation, or a prompt.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for detecting pen proximity and redrawing a user interface to accommodate input from a pen. The illustrated one or more processors 719 together with the computer program code stored in memory 722 constitute exemplary processing means for triggering pen events, means for handling pen events, means for providing pen-compatible controls, and means for redrawing a user interface using the pen-compatible controls.

The term "comprising" is used in this specification to mean including the feature(s) or act(s) followed thereafter, without excluding the presence of one or more additional features or acts.

The invention claimed is:

1. An electronic device comprising:
a user interface;
at least one processor; and
at least one memory comprising computer program code, the at least one memory and the computer program code configured to, with the at least one processor, cause the electronic device to at least:
detect a proximity of a pen device to the user interface of the electronic device;
upon the proximity of the pen device crossing a pen proximity threshold, set a pen proximity flag; and
upon the pen proximity flag being set, redraw the user interface to accommodate input from the pen device, wherein redrawing the user interface includes presenting at least one pen-compatible control on an output interface of the user interface.

2. The electronic device of claim 1, wherein detecting a proximity of a pen device includes detecting a wireless signal from the pen device.

3. The electronic device of claim 2, wherein the wireless signal is a short-range radio frequency signal.

4. The electronic device of claim 2, wherein detecting a proximity of a pen device includes detecting a signal strength of the wireless signal from the pen device; and
wherein the pen proximity threshold includes a defined signal strength threshold.

5. The electronic device of claim 1, wherein redrawing the user interface to accommodate input from the pen device includes redrawing, by an application running on the electronic device, the user interface to accommodate input from the pen device.

6. The electronic device of claim 5, wherein redrawing the user interface to accommodate the input from the pen device includes redrawing the user interface using at least one pen-compatible control from at least one of the application or an operating system associated with the electronic device.

7. The electronic device of claim 1, wherein redrawing the user interface to accommodate the input from the pen device includes redrawing the user interface to include at least one of a highlighted writing region, a zoomed-in writing region, or a prompt.

8. The electronic device of claim 1, the at least one memory and the computer program code configured to, with the at least one processor, further cause the electronic device to at least, upon the user interface being redrawn to accommodate the input from the pen device and determining that the input from the pen device is complete, restore the user interface to a state from prior to the user interface being redrawn to accommodate the input from the pen device.

9. The electronic device of claim 1, wherein detecting a proximity of a pen device includes detecting a proximity of a pen device that is linked to the electronic device.

10. A method comprising:
    executing, by an application, a pen event handler routine that checks the status of a pen event, the pen event indicating that a pen is proximate to a device;
    upon receipt of the pen event from an operating system, setting a flag; and
    upon setting the flag, redrawing a user interface of the application to accommodate input from the pen, wherein redrawing the user interface includes presenting at least one pen-compatible control on an output interface of the user interface.

11. The method of claim 10, wherein redrawing a user interface to accommodate input from the pen includes redrawing the user interface using at least one pen-compatible control.

12. The method of claim 11, wherein redrawing the user interface using at least one pen-compatible control includes retrieving at least one pen-compatible control from an operating system.

13. The method of claim 10, wherein redrawing a user interface to accommodate input from a pen includes redrawing the user interface to include at least one of a highlighted writing region, a zoomed-in writing region, or a prompt.

14. The method of claim 10, further comprising:
    receiving input from the pen via the user interface; and
    upon determining the received input from the pen is complete, restoring the user interface to a state from prior to redrawing the user interface of the application to accommodate input from the pen.

15. The method of claim 14, wherein determining the received input from the pen is complete includes detecting a pause in the received input from the pen that crosses a defined pause threshold.

16. One or more computer storage media having computer-executable instructions that, upon execution by a processor, cause the processor to at least:
    receive, by an operating system, pen proximity data associated with a pen device;
    upon detecting approach of a pen device based on the pen proximity data, trigger a pen event, wherein the pen event is provided to at least one application; and
    upon the pen event being triggered and a pen-compatible control being requested by the at least one application, redraw a user interface associated with the at least one application to display the requested pen-compatible control, wherein redrawing the user interface includes presenting the pen-compatible control on an output interface of the user interface.

17. The one or more computer storage media of claim 16, detecting approach of a pen device based on the pen proximity data includes detecting a wireless signal from the pen device.

18. The one or more computer storage media of claim 17, wherein the wireless signal is a short-range radio frequency signal.

19. The one or more computer storage media of claim 17, wherein detecting approach of a pen device includes detecting a change in signal strength of the wireless signal from the pen device.

20. The one or more computer storage media of claim 16, wherein the pen-compatible control includes at least one of a writing region, an animation, or a prompt.

* * * * *